United States Patent [19]

McKnight

[11] 4,282,172
[45] Aug. 4, 1981

[54] GAS TO LIQUID DIFFUSER

[75] Inventor: William J. McKnight, Tyler, Tex.

[73] Assignee: Howe-Baker Engineers, Inc., Tyler, Tex.

[21] Appl. No.: 186,328

[22] Filed: Sep. 11, 1980

[51] Int. Cl.³ .................................................. B01F 3/04
[52] U.S. Cl. .................................... 261/76; 209/169;
210/220; 210/760; 239/474; 250/533; 261/123;
261/DIG. 42; 261/DIG. 75
[58] Field of Search ..................... 261/76, 93, 87, 123,
261/85, 124, DIG. 42, DIG. 75; 250/533;
210/220, 760, 123; 239/474, 488, 489, 9, 452;
209/169; 435/313, 314

[56] References Cited

U.S. PATENT DOCUMENTS

| | | | |
|---|---|---|---|
| 536,415 | 3/1895 | Bogert | 261/76 |
| 543,411 | 7/1895 | Taylor | 261/DIG. 75 |
| 2,293,183 | 8/1942 | Walker | 261/93 |
| 2,633,344 | 3/1953 | Rekk | 261/76 |
| 2,665,942 | 1/1954 | Bowen | 261/85 |
| 3,128,048 | 4/1964 | Denure | 239/474 X |
| 3,276,698 | 10/1966 | Wood | 239/452 |
| 3,355,106 | 11/1967 | Graham | 239/9 |
| 3,382,980 | 5/1968 | Silva | 210/123 |
| 3,452,966 | 7/1969 | Smolski | 261/123 X |
| 3,536,305 | 10/1970 | Lefrancois | 261/93 |
| 3,645,892 | 2/1972 | Schulman | 261/93 X |
| 3,679,187 | 7/1972 | Smith | 261/123 |
| 3,754,740 | 8/1973 | Piper | 261/124 |
| 3,761,065 | 9/1973 | Rich et al. | 261/76 |
| 3,823,923 | 7/1974 | Chapsal | 261/93 |
| 3,992,491 | 11/1976 | Ihrig et al. | 261/87 |
| 4,018,859 | 4/1977 | Muller | 261/87 |
| 4,019,983 | 4/1977 | Mandt | 210/760 X |
| 4,044,079 | 8/1977 | Tveit | 261/DIG. 75 |
| 4,139,579 | 2/1979 | Blum | 261/76 X |
| 4,156,653 | 5/1979 | McKnight | 250/533 |

Primary Examiner—Richard L. Chiesa
Attorney, Agent, or Firm—Dennison, Meserole, Pollack & Scheiner

[57] ABSTRACT

A static diffuser for use within the water tank of an ozonator system. The diffuser comprises a depending water pipe into which water is fed under pressure by an external pump. The lower end of the pipe flares outward and has an internal fixed cone which combines with the flared end of the pipe to provide an annular laterally directed water discharge. The annular discharge includes angularly directed vanes to enhance the water discharge and assist in forming a high velocity outwardly directed circular sheet of water. The pipe is surrounded, in spaced relation, by a shroud through which the ozone is introduced. The shroud is provided with an annular slot outward of the pipe discharge, the shape of the shroud at the slot forming a modified 360° circular venturi whereby the discharging high velocity sheet of water creates a negative pressure drawing the ozone therewith into the surrounding body of water for a ozonation thereof.

7 Claims, 5 Drawing Figures

GAS TO LIQUID DIFFUSER

BACKGROUND OF THE INVENTION

This invention relates to improvements in ozonator systems, and is primarily concerned with the ozone diffuser itself which functions to discharge ozone into a body of water or other liquid for an ozonation thereof.

Of the known basic ozonator systems, two are considered of specific interest with regard to the present invention. The first system involves the use of a static porous diffuser and must be operated at a positive pressure in order to force the ozone, and its carrier gas (air or oxygen), into the surrounding body of water through a porous ceramic or sintered stainless steel diffuser. Such porous diffusers are normally placed at the bottom of a tank of water and the gas filtered through the porous diffuser creating a column of small bubbles rising to the surface of the water being treated. The ozone and carrier gas in the small bubbles is partially dissolved into the water with the ozone gas that escapes, as the rising bubbles break at the surface, being removed and either destroyed or utilized at other points in the water treatment system. Such a system requires the use of energy consuming gas compressors and compressed air coolers at the input of the air preparation system. Further, the low gas-to-liquid transfer efficiency is a major factor which detracts from such static systems.

Another, more efficient, ozonator system basically follows techniques developed for use in the Swiss-made Kerag system, note for example the background material in applicant's prior U.S. Pat. No. 4,156,653. Such a system utilizes a motorized diffuser which provides a negative pressure or suction to draw the carrier gas through the entire air preparation and ozone generating cells of the ozonator with the ozone ultimately mixing and discharging with a thin sheet of high velocity water generated by a rather complex rotating turbine.

The effectiveness of such a system in ozonating the surrounding body of water is extremely high. However, the motorized diffuser is a complex and expensive device which requires a positioning of the operating components, including the turbine itself and at least the lower portion of the drive shaft, in a submerged environment within the body of liquid being ozonated.

It is operationally desirable to place the rotating turbine near the bottom of the water tank in which the diffuser is located. However, because of potential problems with shaft end whip, and the like, the length of the drive shaft for the turbine has to be limited, this in turn determining the optimum vertical location of the turbine within the tank.

When five to ten minute ozone retention times in the water being processed with ozone is required, the height limitation of the tank in which the diffuser is placed requires a following tank to achieve the longer retention times. Such additional tanks must be made of an appropriate, and normally quite expensive, ozone resistant material.

Other problems and expenses arise from the precision machining and careful balancing required for the assembly, the considerable thickness and stiffness required for the drive shaft, and a normally elaborate system of seals, bearings, moisture sensors, and the like.

In operation, the diffuser with the turbine-like rotor at the lower end of the shaft sucks water from below the turbine through a water intake screen into the center portion of the turbine. The vanes of the rotating turbine impart pressure to this input water which in turn is ejected outward at high velocity as a thin horizontal sheet about a full 360° circle. The sheet of high velocity water subsequently passes outward through a slot in the surrounding shroud. The shape of the shroud about the slot forms a modified circular venturi with the action of the water passing through the venturi section of the shroud creating a negative pressure for a sucking of the carrier gas and ozone through the shroud for ejection with the high velocity water. The water intake screen is considered necessary to prevent entry of water-borne particles into the rotating turbine which could cause pitting of the blades or clogging of the passages, and ultimately an elaborate removal, disassembly and cleaning of the components.

Another less than desirable feature in the driven turbine diffuser is that the drive motors are designed to run at a constant speed. Due to this constant turbine speed, the range of gas flow for proper operation is limited as compared to the range of gas flow allowed through the ozonator.

For example, gas flow through the ozonator can be 5:1. However, permitted gas flow variance into the constant speed diffuser is in the order of 3:1.

Increase of the permissible diffuser gas flow minimum and maximum to match the ozonator gas flow can be done using a variable motor speed controller or by restricting the water inlet to the turbine using a fixed orifice plate. However, the fixed orifice plate must be mechanically removed or installed, a costly time-consuming process to modify gas flow. Further, variable motor speed devices are in themselves quite expensive.

SUMMARY OF THE INVENTION

The present invention proposes, in a system as described above and generally following the techniques of the Kerag system, the use of a diffuser which is unique in its utilization of the exceptional features of the rotating turbine and shroud assembly, and in particular the significant high velocity water discharge and gas diffuser procedures, without requiring the elaborate rotor-turbine construction and its accompanying motor drive, seals, bearings and the like. Rather, the diffuser of the present invention achieves a highvelocity water discharge and gas diffusing action which is at least as efficient as the turbine system, heretofore considered the best available, with a static construction using no rotating parts, seals, bearings, water inlets, or the like in an underwater environment.

Basically, the underwater turbine is replaced by a fixed cone-shaped piece mounted within the flared lower discharge end of a vertical water pipe with the cone and the discharge end of the pipe being so configured and related as to direct a vertical flow of water outward into a horizontal circular sheet of highvelocity water, quite similar to that heretofore achieved by the elaborate rotor-turbine. The flow of water moves outward through the circumferential opening in the surrounding shroud and the associated modified circular venturi, enabling development of a negative pressure within the shroud to suck carrier gas and ozone into the discharging sheet of water. Thus, a negative pressure system is maintained notwithstanding the use of a static diffuser and the elimination of the rotor-turbine action heretofore considered essential.

In operation, a portion of the water to be processed with ozone is fed to an ordinary or conventional water pump, the outlet of which feeds the water into the vertical pipe extending from the top of the water tank for flow vertically therethrough to the fixed cone assembly at the lower discharge end of the pipe. The ozone and carrier gas is fed to the inside of the surrounding shroud for subsequent entrainment in the discharging sheet of water at the shroud formed venturi.

The use of a standard water pump externally located relative to the water tank to achieve the pressure flow of water, as opposed to the turbine generated flow, is significant for a substantial number of reasons including the following:

(1) Substantially lower costs involved in the manufacture of the equipment in that precision machinery and precise balancing of the heretofore required rotating assembly is not necessary.

(2) There are no complex, or for that matter any rotating parts under water which, in the known devices, are particularly difficult to maintain.

(3) No expensive seals are required, this, heretofore, being a potential source of failure.

(4) No periodic cleaning of an underwater turbine intake screen is necessary, thus eliminating partial or complete shut-down of the water treatment plant, use of heavy machinery to lift the entire diffuser for screen cleaning, and several hours of maintenance labor to perform the cleaning and reassembly.

(5) There is no limitation on the location of the diffuser gas-liquid mixing portion. That is, this portion can be placed, if needed, at the bottom of tanks with high ratios of height to width. The length of the water feed pipe to the diffuser is not critical.

(6) Relatively low cost standard off-the-shelf water pumps are used with the pumps being mounted externally of the diffuser tank.

(7) The water pumps need not be ozone resistant, thus making them substantially less costly than the submerged stainless steel rotating turbines.

(8) Low cost standard water filters can be provided externally of the diffuser tank, such filters being quickly and easily replaced.

(9) There is an increased capability of controlling the water flow through the use of simple manual or automatic motor driven valves in the piping external to the diffuser tank. This in turn simplifies the controlling of the maximum and minimum gas flows to match the capability of the ozonator maximum and minimum gas flows.

Should it be considered desirable, two external pumps can be connected in parallel with one pump on standby so that plant operation can be continued without interruption during pump maintenance. Pump maintenance, when compared to the maintenance procedures heretofore required for the submerged turbine, is both quick and relatively simple, particularly in view of the external location of the pumps.

Insofar as energy consumption is concerned, electrical power requirements should be approximately the same for the proposed external water pump arrangement as that required by the submerged turbine assembly. There is no significant difference in producing the desired thin sheet of high velocity water discharging through the shroud venturi whether the water is pumped by the external pump, as propsed herein, or by the submerged turbine. About the same amount of energy is needed to change the direction of water flow by 90°, increase its velocity, and expel it through the annular slot. While a small additional increase in pumping power may be needed to overcome friction loss in the short pipe connecting the external pump to the submerged static diffuser, the significant advantages of substantial lower initial cost and simplicity of the new static design and the benefits flowing therefrom, far outweigh any very small increase in pump horsepower, if in fact such an increase is actually required.

Other objects and advantages of the invention will become apparent from the details of construction and operation as more fully hereinafter described and claimed.

DESCRIPTION OF THE PREFERRED EMBODIMENT

Figure 1:
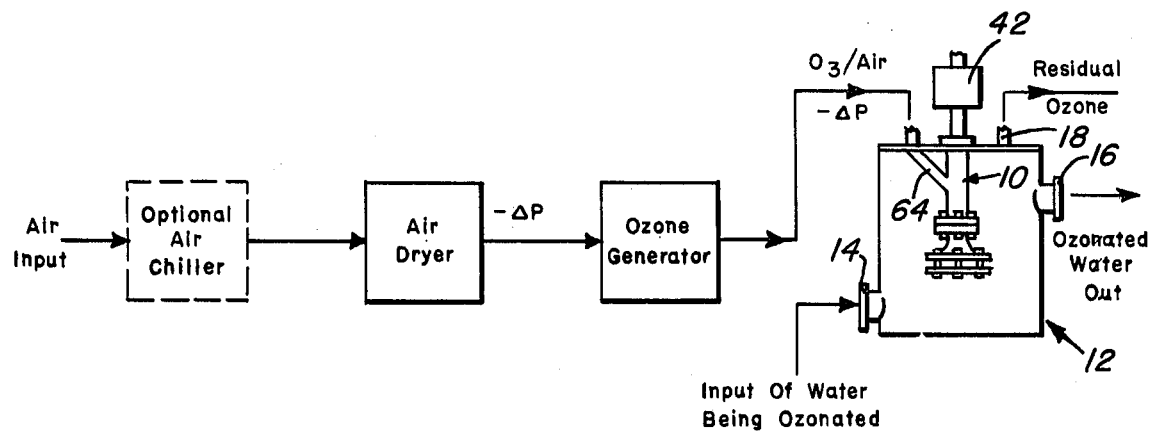
FIG. 1 is a schematic illustration of a simplified negative pressure ozonator system incorporating the diffuser of the present invention.
Figure 1:
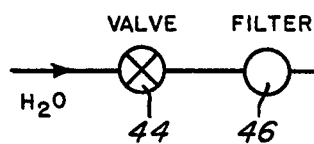
Figure 2:
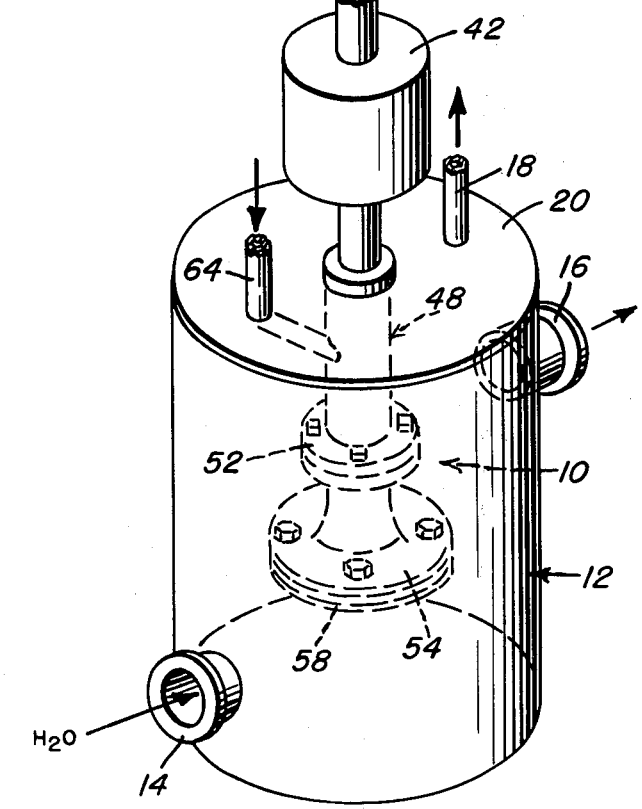
FIG. 2 is an enlarged, partially schematic, illustration of the water tank and diffuser of the system of FIG. 1.

FIG. 1 basically illustrates a negative pressure system of the type heretofore utilizing a positive powered rotor-turbine diffuser to both effect the introduction of the ozone into the water and create the negative pressure.

The present invention proposes the use of a static diffuser in place of the previously used turbine diffuser, which, while less costly than the turbine diffuser, and substantially simpler in construction and maintenance, functions at least equally as well in the system of FIG. 1 both to provide a highly efficient diffusion of the ozone and the generation of the negative pressure to provide the suction necessary to pull the carrier gas or air through the entire air preparation and ozone generating components. Such components will include, downstream from the air input, at least an air dryer and an ozone generator. If deemed necessary, an optional air chiller can also be provided.

The diffuser 10 is positioned within a water, or other liquid, receiving tank 12 within which the ozonation of the water is to take effect. The tank itself will include an water inlet 14 toward the lower end thereof and a water outlet 16 toward the upper end thereof. An appropriate upwardly directed vent 18 can also be provided for a venting of excess or residual gas which might collect above the level of the water.

The diffuser 10 mounts on and depends from the top or lid 20 of the tank 12 which will normally be removably sealed to the tank for access to both the diffuser and the interior of the tank.

Structurally, the diffuser includes a vertically elongated water feed pipe 22 projecting through the tank top 20 and depending vertically into the tank 12 normally to a point toward the bottom thereof. This water pipe is to be fixed and sealed to the lid in any appropriate manner, such as by welding.

The lower discharge end portion 24 of the pipe 22 flares smoothly outward peripherally thereabout with the terminal annular edge 26 being laterally or horizontally directed. As illustrated in the drawings, this lower discharge end portion 24 of the feed pipe can be formed independently of the main linear section of the feed pipe 22 and removably sealed and secured thereto by the provision of opposed bolt receiving collars 28 on the adjoining pipe section ends. Such an arrangement will allow for an independent construction of the discharge end portion which in turn facilitates an accommodation of the water feed pipe to tanks of any desired height by merely varying the length of the linear section of feed pipe.

It is desired that the water flowing vertically downward through the feed pipe 22 be discharged laterally outward in a circular sheet of water travelling at a high velocity. Accordingly, a flow direction modifier 30, in the nature of a sharply tapered cone or conical member, is positioned within the lower discharge end portion 24 of the feed tube 22. The peripheral tapered side wall 32 of the conical modifier is generally arcuate along the height thereof from the narrow peak portion 34, on the central axis of the feed pipe 22, to the generally horizontally directed periphery of the base 36. Formed in this manner, the side wall 32 of the modifier generally parallels the outwardly flaring side wall of the discharge end portion, forming an annular chamber of gradually decreasing width from the vertically directed initial flow splitting apex 34 of the modifier 30 to and through the laterally turned annular passage forming walls of the modifier and discharge end portion of the feed pipe. This tapering of the annular passage assists in accelerating the flow of water and providing the desired high velocity discharge.

Figure 5:
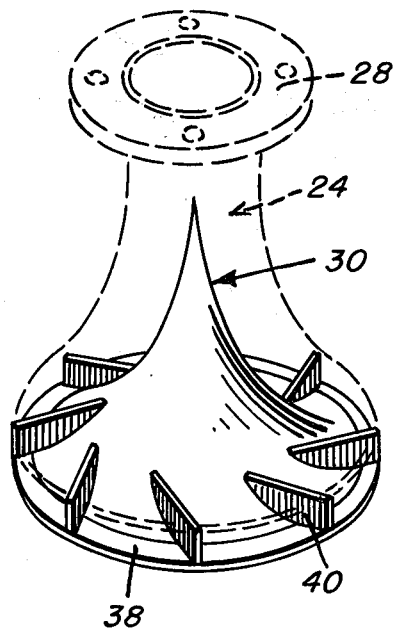
FIG. 5 is a somewhat schematic illustration of the discharge end of the water pipe of the diffuser.
Figure 3:
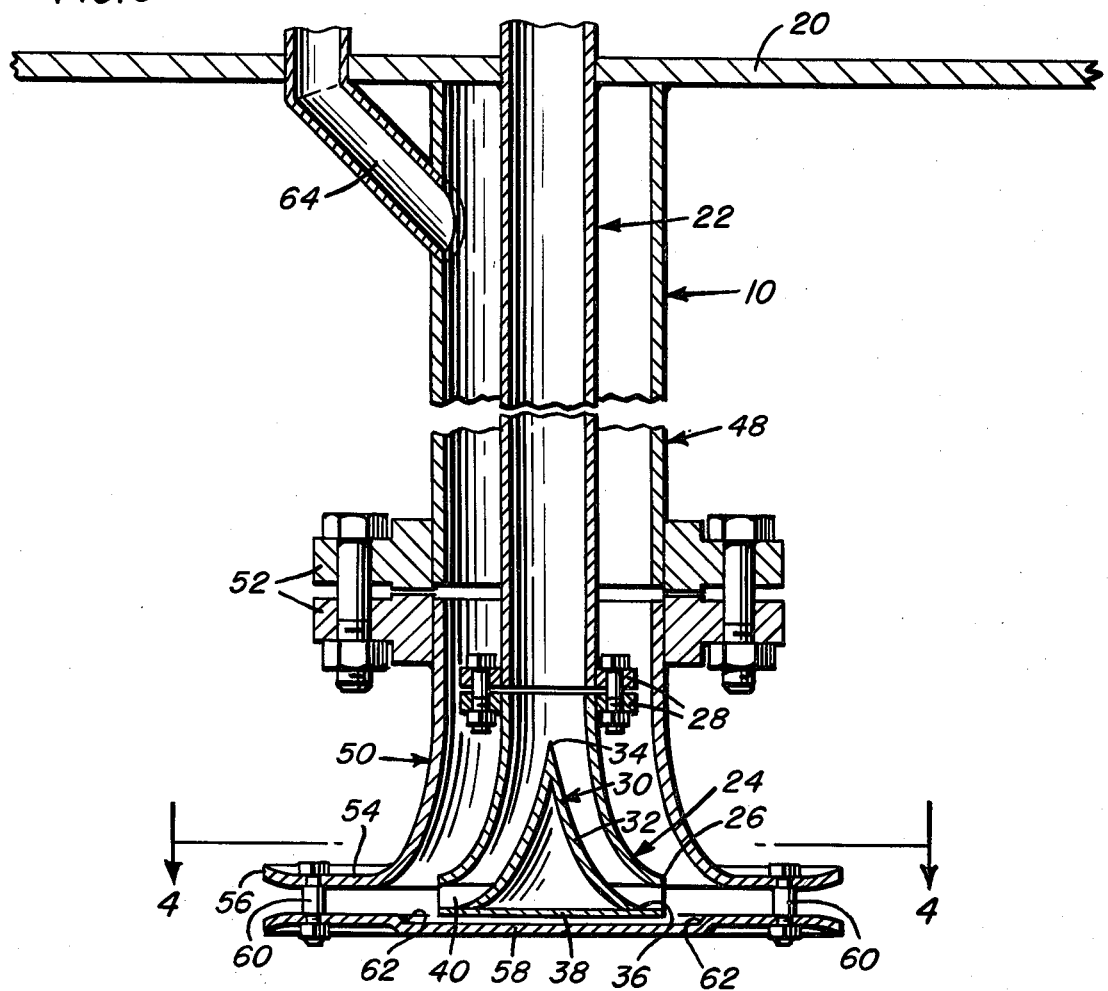
FIG. 3 is a vertical cross sectional detail through the diffuser of FIG. 2.
Figure 4:
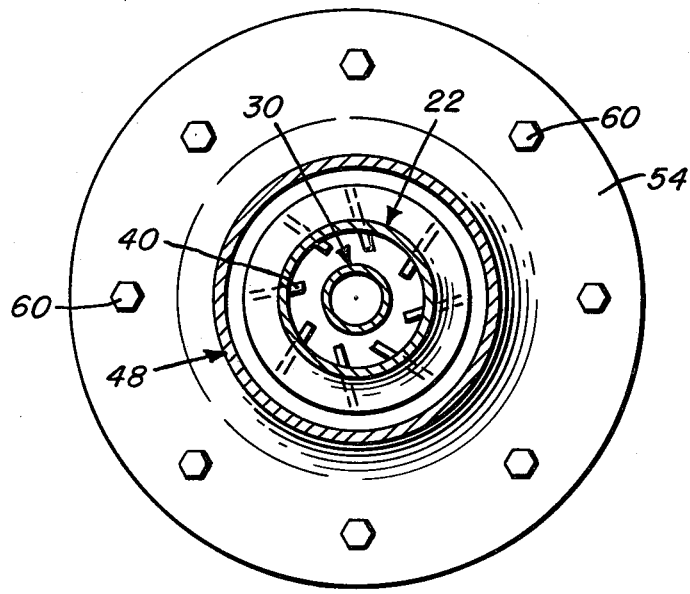
FIG. 4 is a cross sectional detail taken substantially on a plane passing along Line 4—4 in FIG. 3.

It will be noted that a flat disc 38 is fixed to and underlies the conical modifier 30, the disc 38 projecting horizontally beyond the peripheral edge 36 of the base and extending outward to align with the laterally directed peripheral edge 26 of the discharge end portion 24, defining therewith an annular discharge opening. If so desired, the horizontal modifier-base surrounding portion of the underlying disc 38 can be formed as an integral annular extension of the modifier 30. In order to equalize the flow rate of the high velocity horizontal discharge of the annular flow of water in a thin sheet circumferentially about the discharge opening or outlet of the discharge end portion, and to provide a swirling action of the horizontal high velocity sheet of water, multiple angularly directed horizontal extending vanes 40 are provided between the bottom or base disc 38 and the laterally flared end of the discharge end portion 24. These vanes 40 extend inwardly from the horizontally directed peripheral edge 26 into overlying engagement with the lower outwardly flaring portion of the conical wall 32 of the modifier 30. As will be appreciated, the vanes 40, welded or otherwise fixed to the modifier assembly 30 and the lower discharge end portion 24, also function as means for mounting and positioning the modifier assembly. Noting FIGS. 4 and 5, the vanes extend at a constant acute angle outward from the conical wall 32 of the modifier at equally spaced points about the periphery thereof. It is the purpose of the static vanes 40 to enhance the outward flow of water in a homogeneous annular sheet. The actual number of vanes provided can be varied so as to achieve their purpose.

The water or liquid passing down the feed pipe 22 is a portion of the liquid which is to be processed with ozone within the tank 12. As such, the liquid is directed to an externally mounted conventionally structured water pump 42, the outlet of which feeds the liquid, under pressure, into a vertical extension of the feed pipe 22 above the top 20 of the tank 12. This pump pressurized flow of liquid vertically downward through the feed pipe 22 and out the sheet forming discharge end portion thereof produces, in a static structure, the highly desired outward flow heretofore necessitating the previously described complex rotor-turbine assembly.

In conjunction with the external pump 42, and as an expeditious and convenient manner of handling the flow, simple manual or automatic motor driven valves 44 can be provided as desired. Similarly, low cost standard water filters 46 can be used.

A principal purpose of obtaining the above described high velocity outward flow of the water in an annular sheet is to cause a negative pressure in the system, sucking the carrier gas therethrough, as suggested in FIG. 1, and picking up the generated ozone for a pressure discharge thereof into the surrounding body of water in the tank 12. The actual ozone pickup is effected within a tubular shroud 48 which surrounds the feed pipe 22 in outwardly spaced relation thereto. The shroud is mounted on and sealed to the tank top 20, as by welding, and extends vertically downward therefrom defining an annular chamber about the coaxial feed pipe 22. The lower end portion 50 of the shroud 48 may, as a matter of convenience, be separately formed from the main length of the shroud 48 and releasably sealed thereto through bolt secured flanges or collars 52 on the adjoining ends. This lower end portion 50 is generally configured in the manner of the discharge end portion 24 of the feed pipe 22 and similarly flares outwardly into an annular horizontal portion 54, the extreme edge 56 of which is slightly upwardly directed.

Underlying this flared lower end portion 50 of the shroud 48, is slightly spaced relation thereto, is an annular plate 58, the peripheral portion of which combines with the overlying annular portion 54 to define a peripheral discharge slot generally aligned with the circumferential discharge opening of the combined feed pipe discharge portion 24 and modifier 30. The mounting and spacing of the plate 58 can be effected by combined bolts and spacers 60, as illustrated. Such bolts and spacers, positioned about the assembly, effectively mount the plate 58 and provide little interference with the desired outward flow.

In forming the horizontally directed annular discharge slot about the base of the shroud, it will be appreciated that the shroud is configured to form a modified 360° circular venturi through which the high velocity sheet of water passes. The action of the water passing through the venturi section creates the desired negative pressure which sucks the carrier gas and ozone into this curcular venturi and through the circular discharge slot for introduction into the surrounding body of liquid. If desired, so as to enhance the venturi effect, the peripheral portion of the bottom plate 58 can be slightly upwardly offset, forming a tapered shoulder as at 62. Incidentally, as will be appreciated from the drawings, the generated ozone is introduced into the shroud 48, normally toward the upper end thereof, through an appropriate branch tube 64.

From the foregoing, it will be readily apparent that a highly unique diffuser, for use in an ozonator system, has been defined. This diffuser, considered fully as effective as previously used rotor-turbine diffusers, provides significant advantages in reduced initial costs, reduced maintenance, simplicity of operation, and the like, all of which contribute to what is believed to be a significant advance in the art.

The foregoing is considered illustrative of the principals of the invention. As other embodiments and modifications may occur to those skilled in the art, it is not desired to limit the invention to the exact construction and operation shown and described. Rather, the invention is considered to encompass all suitable modifications and equivalents which fall within the scope of the invention as claimed.

I claim:

1. For use in an ozonator system incorporating a tank within which liquid is to be ozonated; a static diffuser, said diffuser comprising a liquid feed pipe having a discharge end portion adapted for positioning within the tank below the level of liquid within the tank, said discharge end portion being outwardly flared, a static flow modifier positioned within the flared discharge end portion and defining therewith a liquid discharge opening laterally directed relative to said pipe, means for producing a pressurized flow of liquid through said pipe and out said discharge opening, an ozone feeding shroud outward of and generally paralleling said pipe, a discharge slot in said shroud in outwardly aligned relation with said discharge opening for passage of discharging liquid therethrough, said shroud, at the shroud slot, defining a general venturi configuration for acceleration of the liquid passing therethrough and entrainment of ozone within the discharging liquid.

2. The diffuser of claim 1 wherein the flared end portion of the pipe is circular, said flow modifier being positioned centrally therein with the defined liquid discharge opening being circular for a discharge of liquid in an annular sheet.

3. The diffuser of claim 2 wherein said flow modifier is of a conical configuration with a peripheral wall generally paralleling the outward flare of the surrounding discharge end portion of the feed pipe.

4. The diffuser of claim 3 wherein the conically configured modifier and surrounding discharge end portion of the feed pipe define an annular flow chamber therebetween which generally decreases in size toward the discharge opening for an acceleration of liquid passing therethrough.

5. The diffuser of claim 4 including multiple vanes positioned within the liquid discharge opening peripherally about the flared discharge end portion, said vanes being similarly angularly directed for effecting a circular movement of the discharging liquid.

6. The diffuser of claim 3 including multiple vanes positioned within the liquid discharge opening peripherally about the flared discharge end portion, said vanes being similarly angularly directed for effecting a circular movement of the discharging liquid.

7. The diffuser of claim 6 wherein the discharge end portion of the feed pipe is separately formed therefrom and releasably mounted thereon.

* * * * *